US006319981B1

(12) United States Patent
Dhein et al.

(10) Patent No.: US 6,319,981 B1
(45) Date of Patent: Nov. 20, 2001

(54) COATING COMPOUNDS, A PROCESS FOR THEIR PRODUCTION AND THEIR USE FOR THE PRODUCTION OF COATINGS

(75) Inventors: Rolf Dhein; Knud Reuter, both of Krefeld; Lothar Bäcker, Dormagen; Joachim Probst; Werner Kubitza, both of Leverkusen; Rainer Rettig, Kürten, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/211,698

(22) PCT Filed: Oct. 15, 1992

(86) PCT No.: PCT/EP92/02373

§ 371 Date: Apr. 13, 1994

§ 102(e) Date: Apr. 13, 1994

(87) PCT Pub. No.: WO93/09157

PCT Pub. Date: May 13, 1993

(30) Foreign Application Priority Data

Oct. 29, 1991 (DE) ................................. 41 35 571

(51) Int. Cl.$^7$ ................................. C08K 3/20
(52) U.S. Cl. ................................. 524/591
(58) Field of Search ................................. 524/591

(56) References Cited

U.S. PATENT DOCUMENTS 4,945,128 * 7/1990 Hille et al. ........................... 524/591
5,066,759   11/1991 Hille et al. ........................... 528/60
5,075,370   12/1991 Kubitza et al. ...................... 524/591
5,372,875 * 12/1994 Markusch et al. ................... 428/228

FOREIGN PATENT DOCUMENTS 4101527   7/1992 (DE) .

* cited by examiner

*Primary Examiner*—Edward J. Cain
(74) *Attorney, Agent, or Firm*—Joseph C. Gil; Thomas W. Roy

(57) ABSTRACT

The present invention relates to coating compounds of which the binder consists essentially of a combination of

- a) a polyol component dissolved and/or dispersed in water or a water/solvent mixture, and
- b) a polyisocyanate component emulsified in the solution and/or dispersion of the polyol component with a viscosity at 23° C. of 50 to 10,000 mPa.s, in quantities corresponding to an equivalent ratio of isocyanate groups of component a) to alcoholic hydroxyl groups of component b) of 0.5:1 to 5:1, characterized in that component consists essentially of

- a1) a water-dilutable, hydroxyfunctional polycondensate resin free from urethane and sulfonate groups and having a molecular weight Mn above 500 or
- a2) a mixture of such a polycondensation resin with up to 100% by weight, based on the weight of the polycondensation resin, of at least one water-dilutable, hydroxyfunctional polymerization resin having a molecular weight Mn above 500.

The present invention also relates to a process for the preparation of these coating compounds and to their use for the production of coatings.

1 Claim, No Drawings

COATING COMPOUNDS, A PROCESS FOR THEIR PRODUCTION AND THEIR USE FOR THE PRODUCTION OF COATINGS

This invention relates to a new water-containing coating compound based on a polyol component in solution and/or dispersion in an aqueous medium and consisting of a relatively high molecular weight polycondensation resin or of a mixture of a polycondensation resin with a polymerization resin and a polyisocyanate component emulsified therein, to a process for the production of this coating compound and to its use for the production of coatings.

Water-based lacquer systems are acquiring increasing significance for economic and ecological reasons. However, the replacement of conventional lacquer systems is progressing more slowly than had initially been expected.

There are many reasons for this. Thus, water-based dispersions still have disadvantages in terms of processing by comparison with lacquer systems dissolved in organic solvents. By contrast, water-based solutions are attended by the problem of adequate solubility in water on the one hand and the—paradoxically—lower resistance of the coatings to water by comparison with conventionally dissolved lacquer systems. There are also processing problems in this regard which often arise out of the high viscosity and viscosity anomaly and which, hitherto, have been overcome by the use of organic auxiliary solvents. However, the quantity of auxiliary solvent used is limited because otherwise the ecological sense of water-based systems would been obscured.

It is only recently that water-based two-component polyurethane systems have become known (DE-OS 3 829 587) in which the binder consists of a polyacrylate resin dissolved or dispersed in water in combination with a polyisocyanate containing free isocyanate groups emulsified in this dispersion or solution. The systems in question are substantially solventless systems as can be seen from the fact the solvents used in the production of the polymer resins are removed before the production of the water-based preparation.

One of applicants' earlier proposals (German patent application P 41 01 527.4) relates to water-based two-component polyurethane systems based on urethane-modified polyester resins dissolved or dispersed in water and polyisocyanates emulsified in these solutions or dispersions.

It has now surprisingly been found that analogous systems based on polycondensation resins free from urethane groups, more particularly polyester resins, are also suitable as binders for water-based or water-containing organic lacquers;

The present invention relates to coating compounds of which the binder consists essentially of a combination of a) a polyol component dissolved and/or dispersed in water or a water/solvent mixture and b) a polyisocyanate component emulsified in the solution and/or dispersion of the polyol component a) with a viscosity at 23 C. of 50 to 10,000 mPa.s in quantities corresponding to an equivalent ratio of isocyanate groups of component b) to alcoholic hydroxyl groups of component a) of 0.5:1 to 5:1, characterized in that component a) consists essentially of a1) a water-dilutable, hydroxyfunctional polycondensation resin free from urethane and sulfonate groups and having a molecular weight Mn above 500 or a2) a mixture of such a polycondensation resin with up to 100% by weight, based on the weight of the polycondensation resin, of at least one water-dilutable, hydroxyfunctional polymerization resin having a molecular weight Mn above 500.

The present invention also relates to a process for the production of these coating compounds which is characterized in that a polyisocyanate component b) having a viscosity at 23° C. of 50 to 10,000 mPa.s and consisting of at least one organic polyisocyanate is emulsified in an aqueous or aqueous organic solution or dispersion of a relatively high molecular weight polyol component a) consisting essentially of a1) a water-dilutable, hydroxyfunctional polycondensation resin free from urethane and sulfonate groups and having a molecular weight Mn above 500 or a2) a mixture of such a polycondensation resin with up to 100% by weight, based on the weight of the polycondensation resin, of at least one water-dilutable, hydroxyfunctional polymerization resin having a molecular weight Mn above 500, the quantitative ratios between the individual components corresponding to an equivalent ratio of isocyanate groups to alcoholic hydroxyl groups of component a) of 0.5:1 to 5:1 and any auxiliaries and additives used being incorporated in the system before addition of the polyisocyanate.

The present invention also relates to the use of these coating compounds for the production of coatings.

The relatively high molecular weight polyol component a1) consists essentially of water-dilutable, i.e. water-soluble or water-dispersible, hydroxyfunctional polycondensation resins free from urethane and sulfonate groups and having a molecular weight Mn above 500.

The expression "polycondesation resins " is intended in particular to encompass (i) polyester resins free from fatty acids and oils and (ii) fatty-acid- or oil-modified polyester resins, so-called "alkyd resins ".

Polycondensation resins suitable as component a1) are, in particular, those having a molecular weight above 500 and up to 10,000, molecular weights of up to 5,000 being determined by vapor pressure osmometry in dioxane and acetone (in the event of differing values, the low value is regarded as correct) and molecular weights above 500 being determined by membrane osmometry in acetone. The polycondensation resins generally have hydroxyl values of 30 to 300 and preferably 50 to 200 mg KOH/g and acid values of 25 to 70 and preferably 35 to 55 mg KOH/g. The acid value is based both on the free carboxyl groups and on the carboxyl groups present in neutralized form as carboxylate groups which—particularly where they are neutralized with tertiary amines—are also included in the titration with potassium hydroxide. Tertiary amines, such as for example triethylamine, N,N-dimethyl ethanolamine or N-methyl diethanolamine, are used for the at least partial neutralization of the carboxyl groups present in the polycondensation resins. The polycondensation resins generally contain 50 to 150 milliequivalents—per 100 g solids—of carboxylate groups.

The polyester resins and alkyd resins are produced in known manner by polycondensation of alcohols and carboxylic acids as defined, for example, in Römpp's Chemielexikon, Vol. 1, page 202, Frankh'sche Verlagsbuchhandlung, Stuttgart, 1966, or in D. H. Solomon, The Chemistry of Organic Filmformers, pages 75–101, John Wiley & Sons Inc., New York, 1967.

Starting materials for the production of the polycondensation resins are, for example, 1- to 6- and preferably 1- to 4-hydric alcohols having a molecular weight in the range from 32 to 500, such as ethylene glycol, propylene glycol, butanediols, neopentyl glycol, 2-ethylpropane-1,3-diol, hexanediols; ether alcohols, such as di- and triethylene glycol; ethoxylated bisphenols; perhydrogenated bisphenols, also trimethylol ethane, trimethylol propane, glycerol, pentaerythritol, dipentaerythritol, mannitol and sorbitol, monohydric chain-terminating alcohols, such as methanol, propanol, butanol, cyclohexanol and benzyl alcohol;

polybasic carboxylic acids or carboxylic anhydrides having a molecular weight of 100 to 300, such as phthalic acid, phthalic anhydride, isophthalic acid, terephthalic acid, tetrahydrophthalic acid (anhydride) hexahydrophthalic acid, trimellitic anhydride, pyro- mellitic anhydride, maleic anhydride, adipic acid or succinic anhydride;

aromatic or saturated aliphatic monocarboxylic acids, such as for example benzoic acid, hexahydrobenzoic acid, tert. butyl benzoic acid, coconut oil fatty acids or α-ethylhexanoic acid;

olefinically unsaturated fatty acids and derivatives of olefinically unsaturated fatty acids, such as for example linseed oil, soybean oil, wood oil, safflower oil, ricinene oil, sunflower oil, cottonseed oil, peanut oil or tall oil fatty acid, synthetic olefinically unsaturated $C_{12-22}$ fatty acids and derivatives obtained by conjugation, isomerization or dimerization of these fatty acids;

the oils corresponding to the natural fatty acids just mentioned, i.e. linseed oil, soybean oil, wood oil, safflower oil, ricinene oil, sunflower oil, cottonseed oil, peanut oil, tall oil or even castor oil.

In the production of polyesters free from fatty acids and oils, the monohydric and, in particular, polyhydric alcohols mentioned by way of example are reacted with the polybasic acids mentioned by way of example by methods known per se.

The alkyd resins containing fatty or oleic acids are prepared in known manner from polyols of the type mentioned by way of example and dicarboxylic acids or anhydrides of the type mentioned by way of example using non-drying, semi-drying or drying oils of the type mentioned by way of example or transesterification products thereof with polyhydric alcohols of the type mentioned by way of example. Instead of the oils or their transesterification products, it is also possible to use fatty acids or oleic acids of natural oils or synthetic fatty acids or fatty acids obtainable from natural fatty or oleic acids by hydrogenation, dehydration or dimerization.

Preferred polyols for the production of the alkyd resins are at least trihydric alcohols, such as glycerol or trimethylol propane. Tetrahydric and higher alcohols, such as pentaerythritol, dipentaerythritol or sorbitol or mixtures thereof with the polyols mentioned above are particularly suitable for the production of the water-dilutable resins because high hydroxyl values of the alkyd resins promote dilutability with water. Dihydric alcohols, such as ethylene glycol, diethylene glycol, butanediols or neopentyl glycol may also be partly used.

Acids or acid anhydrides particularly suitable for the production of the alkyd resins are adipic acid, isophthalic acid, phthalic acid and especially phthalic anhydride.

The necessary hydroxyl group content is established in known manner by suitable choice of the type of and quantitative ratios between the starting components within the scope of the disclosure.

The carboxyl groups which are responsible for the dilutability of the resins with water, particularly after they have been neutralized, may be introduced, for example, by semiester formation from a preformed hydroxyfunctional polyester resin with acid anhydrides of the type mentioned. Tetrahydrophthalic anhydride is particularly suitable for the semiester-forming reaction. carboxyl groups may also be introduced, for example, by the co-use for the polycondensation reaction of dimethylol propionic acid of which the free carboxyl group generally does not participate in the polycondensation reaction on account of steric hindrance, so that this acid is incorporated solely through the hydroxyl groups.

The polymerization resins which may be part of component a2), which is optionally used, are preferably polyacrylate resins, i.e. hydroxyfunctional copolymers which have a hydroxyl value of 15 to 200 mg KOH/g and an acid value of 5 to 250 mg KOH/g and which, in addition, have a content of chemically bound carboxylate and/or sulfonate groups of, in all, 8 to 450 milliequivalents per 100 g solids. The acid value is based both on the free non-neutralized acid groups, particularly carboxyl groups, and on the neutralized acid groups, particularly carboxylate groups. The copolymers generally have a molecular weight Mn, as determined by gel permeation chromatography using polystyrene as standard, in the range from 500 to 50,000 and preferably in the range from 1000 to 25,000.

The copolymers are preferably copolymers of

A 1 to 30% by weight and preferably 1 to 10% by weight acrylic acid and/or methacrylic acid, B 0 to 50% by weight methyl methacrylate, C 0 to 50% by weight styrene, the sum of B+C being 10 to 70% by weight, D 10 to 45% by weight of one or more $C_{1-8}$ alkyl acrylates, E 5 to 45% by weight of one or more monohydroxy functional alkyl acrylates or alkyl methacrylates, F 0 to 15% by weight other olefinically unsaturated monomers, the sum of A to F being 100% by weight, in addition to which 5 to 100% of the acid groups present in copolymerized form may be neutralized with aliphatic amines or with ammonia, so that the content of anionic salt-like groups in the copolymers corresponds to the foregoing observations.

As mentioned above, the unsaturated acids A and, optionally, F present in copolymerized form are at least partly neutralized, so that the resulting anionic groups guarantee or at least facilitate the solubility or dispersibility of the copolymers in water. Where only low concentrations of salt-like groups are present, the solubility or dispersibility of the copolymers in water can be facilitated by the co-use of external emulsifiers. At all events, the dilutability of the copolymers with water either in the form of a dispersion or in the form of a colloidally to molecularly disperse "solution" must be guaranteed.

The monomers B and C may be varied in such a way that only one of the monomers is present in the sum B+C of 10 to 70% by weight, methyl methacrylate being preferred in that case although it is particularly preferred to use both methyl methacrylate and also styrene alongside one another.

The $C_{1-8}$ alkyl acrylate D may be selected, for example, from methyl acrylate, ethyl acrylate, n-propyl acrylate, isopropyl acrylate, n-butyl acrylate, isobutyl acrylate, n-hexyl acrylate, n-octyl acrylate, 2-ethylhexyl acrylate. n-Butyl acrylate, n-hexyl acrylate and 2-ethylhexyl acrylate are preferred, n-butyl acrylate and/or n-hexyl acrylate being particularly preferred.

The hydroxyfunctional (meth)acrylates E may be selected, for example, from hydroxyethyl (meth)acrylate, hydroxypropyl (meth)acrylate (isomer mixture obtained by addition of propylene oxide onto (meth)acrylic acid), 4-hydroxybutyl (meth)acrylate or mixtures of these monomers. 2-Hydroxyethyl methacrylate and the hydroxypropyl methacrylate isomer mixture mentioned are preferred.

The other monomer units F may be substituted styrene derivatives such as, for example, the isomeric vinyl toluenes, α-methyl styrene, propenylbenzene, $C_{5-12}$ cycloalkyl (meth)acrylates, vinyl esters, such as vinyl acetate, propionate or versatate, vinyl sulfonic acid, the total quantity of polymerizable acids (carboxylic acid A plus the acids mentioned under F, if present) not exceeding 30% by weight.

The tertiary amines already mentioned by way of example are particularly suitable for the at least partial neutralization of the acid groups present in the polycondensation resins or polymerization resins.

The polyol component a) is present in solution or dispersion in water or in a mixture of water and organic solvents. Suitable solvents which may serve as the continuous phase in addition to water are those which are inert in the context of the isocyanate addition reaction and which boil below 300° C. and preferably at 100 to 250° C. under normal pressure (1013 mbar). Preferred solvents contain ether and/or ester groups in the molecule and are compatible with water to such an extent that the solutions or dispersions represent systems with a homogeneously dispersed $H_2O$/co-solvent phase. Examples of particularly suitable solvents a3) are 1,4-dioxane, 1,3,5-trioxane, diethylene glycol dimethyl ether, 1,3-dioxolane, ethylene glycol diacetate, butyl diglycol acetate or mixtures thereof.

In general, 0 to 50% by weight and preferably 0 to 20% by weight of the continuous phase of the solutions or dispersions of the polyol component a) consists of solvents of the type mentioned by way of example and, for the rest, of water. The binder components a1) and, optionally, a2) are preferably present in the solution or dispersion a) in a total quantity of 20 to 65% by weight.

The preparation of the solutions or dispersions of the polyol component a) may optionally be accompanied by neutralization of the acid groups present, for example by introducing the carboxyfunctional polycondensation resins and, optionally, polymerization resins into an aqueous or aqueous organic solution of the neutralizing agent. It is also possible initially to take up the resins in a solvent of the type mentioned by way of example, to neutralize the resulting solution by addition of a tertiary amine and then to stir the solution with water. In another variant, the solution in the organic solvent is mixed with a solution of the neutralizing agent.

The polyisocyanate component b) may be selected from any organic polyisocyanates containing aliphatically, cycloaliphatically, araliphatically and/or aromatically bound free isocyanate groups which are liquid at room temperature. The polyisocyanate component b) generally has a viscosity at 23° C. of 50 to 10,000 and preferably 50 to 1000 mPa.s. In a particularly preferred embodiment, the polyisocyanate mixture is a mixture containing only aliphatically and/or cycloaliphatically bound isocyanate groups having an (average) NCO functionality of 2.2 to 5.0 and a viscosity at 23° C. of 50 to 500 mPa.s.

Polyisocyanates suitable as component b) are, in particular, the so-called "lacquer polyisocyanates" containing aromatically or (cyclo)aliphatically bound isocyanate groups, the last-mentioned aliphatic polyisocyanates being particularly preferred as mentioned above.

Eminently suitable "lacquer polyisocyanates" are, for example, those based on hexamethylene diisocyanate or on 1-isocyanato-3, 3,5-trimethyl-5-isocyanatomethyl cyclohexane (IPDI) and/or bis-(isocyanatocyclohexyl)-methane, especially those based solely on hexamethylene diisocyanate. "Lacquer polyisocyanates" based on these diisocyanates are understood to be the biuret-, urethane-, uretdione- and/or isocyanurate-modified derivatives of these diisocyanates known per se which, after their production, are freed in known manner, preferably by distillation, from excess starting diisocyanate to a residual content of less than 0.5% by weight. Preferred aliphatic polyisocyanates used in accordance with the invention include biuret-modified polyisocyanates based on hexamethylene diisocyanate which correspond to the criteria mentioned above, for example of the type obtainable by the processes according to U.S. Pat. Nos. 3,124,605, 3,358,010, 3,903,126, 3,903,127 or 3,976,622, and which consist of mixtures of N,N',N"-tris-(6-isocyanatohexyl)-biuret with small quantities of its higher homologs and the cyclic trimers of hexamethylene diisocyanate obtainable in accordance with U.S. Pat. No. 4,324,879 which correspond to the above-mentioned criteria and which consist essentially of N,N',N"-tris-(6-isocyanatohexyl)-isocyanurate in admixture with small quantities of its higher homologs. Particular preference is attributed to mixtures of uretdione and/or isocyanurate polyisocyanates based on hexamethylene diisocyanate which correspond to the above-mentioned criteria and which are formed by catalytic oligomerization of hexamethylene diisocyanate using trialkyl phosphines. Corresponding mixtures which have a viscosity at 23° C. of 50 to 500 mPa.s and an NCO functionality of 2.2 to 5.0 are particularly preferred.

The aromatic polyisocyanates which are also suitable, but less preferred, for use in accordance with the invention are in particular "lacquer polyisocyanates" based on 2,4-diisocyanatotoluene or technical mixtures thereof with 2,6-diisocyanatotoluene or on 4,4'-diisocyanatodiphenyl methane or mixtures thereof with its isomers and/or higher homologs. Aromatic lacquer polyisocyanates of the type in question are, for example, the urethane-modified isocyanates obtained by reaction of excess quantities of 2,4-diisocyanatotoluene with polyhydric alcohols, such as trimethylol propane, and subsequent removal of the unreacted excess diisocyanate by distillation. Other aromatic lacquer polyisocyanates are, for example, the trimers of the monomeric diisocyanates mentioned by way of example, i.e. the corresponding isocyanatoisocyanurates, which are also freed from excess monomeric diisocyanates, preferably by distillation, after their production.

It is of course also possible in principle to use unmodified polyisocyanates of the type mentioned by way of example providing they correspond to the foregoing observations in regard to viscosity.

It is possible in principle, although generally not necessary by virtue of the emulsifying effect of components a1) and a2), to use hydrophilically modified polyisocyanates as component b) or as part of component b). The polyisocyanates may be hydrophilically modified, for example, by partial reaction of the isocyanate groups with monohydric polyether alcohols containing ethylene oxide units, for example the ethoxylation products of simple alkanols containing 5 to 100 ethylene oxide units per molecule. Ionic modification of the polyisocyanate component, for example by reaction with less than equivalent quantities of dimethylol propionic acid and subsequent neutralization of the resulting reaction product, is possible in principle, but generally not necessary.

In addition to components a1), a2) and b), auxiliaries and additives known from lacquer technology may be present in the coating compounds according to the invention, including for example pigments, foam inhibitors, flow control agents, dispersion aids for dispersing the pigments, siccatives, fillers, catalysts for the isocyanate addition reaction, foam inhibitors or even (less preferably) auxiliary solvents which are not incorporated in the film.

To produce the ready-to-use coating compound, the polyisocyanate component b) is emulsified in an aqueous or aqueous organic solution or dispersion of component a). Mixing may be carried out simply by stirring at room temperature. The quantity of polyisocyanate component b) is gauged in such a way that an equivalent ratio of isocyanate groups of component b) to isocyanate-reactive groups of components a1) and a2) of 0.5:1 to 5:1 and preferably 0.8:1 to 2:1 is obtained.

The auxiliaries and additives used, if any, are incorporated in the system by stirring, preferably before addition of the polyisocyanate component b).

The coating compounds according to the invention may be applied to any substrates by the usual methods, for example by spray coating, dip coating or spread coating, and crosslinked at room temperature to 160° C. and preferably at 60 to 140° C. Where high curing temperatures are applied, stoving times of 15 to 45 minutes are generally sufficient. The resulting lacquer films are scratch-resistant (nail-hard) and solvent-resistant, bubble-free, glossy and—as clear lacquers—transparent.

The use according to the invention is particulary suitable for the production of primer coats or top coats on wood, metal and plastic substrates, for example for the production of fillers, base coats and clear coats in the original and repair lacquering of motor vehicles, for lacquering furniture, industrial lacquers, for building protection, etc.

In the following Examples, all percentages and parts are by weight.

EXAMPLE 1

1127.1 Parts propane-1,2-diol, 755.9 parts trimethylol propane, 746.2 parts adipic acid and 1828.5 parts phthalic anhydride are esterified under nitrogen at 230° C. to an acid value of 7.9 and a viscosity of 143 seconds (as measured on a 60% by weight solution in dimethyl formamide in accordance with DIN 53 211). To avoid large losses of propanediol, the esterification is carried out in a column. In addition, the temperature is increased from 140 to 230° C. in stages of 10° C./h. The characteristic data mentioned above are achieved following an after-reaction time of 3.5 h at 230° C.

309.5 Parts tetrahydrophthalic anhydride (molten) are added at 130° C. to 3309.7 parts of this resin. The mixture is then left to after-react at 130° C. until the resin has an acid value of 39. Its viscosity, as measured on a 60% by weight solution in dimethyl formamide in accordance with DIN 53 211, is 182 seconds. The solvent-free resin has an OH value of 150 mg KOH/g.

The resin obtained was dissolved in diethylene glycol dimethyl ether to form a 63% solution and then neutralized by addition of 4.6 parts dimethyl ethanolamine to 100 parts 63% resin solution. The solution was then diluted with water to a resin content of 29.3% by weight.

Starting out from this aqueous solution, two-component waterborne lacquers were prepared with an aliphatic lacquer polyisocyanate in NCO:OH equivalent ratios of 1.25:1, 1.50:1 and 1.75:1. A biuret-modified polyisocyanate based on hexamethylene diisocyanate (NCO content 22.5%) was used as the lacquer polyisocyanate. The polyisocyanate was added to the aqueous solution of the resin in the form of a 75% by weight solution in diethylene glycol dimethyl ether. After intensive stirring, a stable emulsion is obtained, remaining processible for about 30 minutes. Using a film drawing frame, the emulsions obtained are coated onto glass plates in a wet film thickness of 180 μm and cured for 30 minutes at 80° C. or 120° C. All the films obtainable in this way are crosslinked to the point where they are acetone-resistant and show excellent scratch resistance and hardness.

EXAMPLE 2

1620.2 Parts castor oil, 581.9 parts trimethylol propane, 485.4 parts pentaerythritol, 470.9 parts benzoic acid and 1141.6 parts phthalic anhydride are introduced under nitrogen into a V2A tank reactor equipped with a stirrer, inlet pipe, distillation bridge and thermometer and then heated to 140° C. The temperature is then increased from 140 to 260° C. (10° C./h) over a period of 12 h during which nitrogen is passed through at a rate of 3 liters per hour. The mixture is then condensed at 260° C until, after initially falling, the viscosity increases again. The resin obtained has an acid value of 5.0 and a viscosity of 109 seconds (70% by weight in xylene, DIN 53 211).

329.7 Parts tetrahydrophthalic anhydride (molten) are added to 2789.9 parts of this resin at 150° C., followed by an after-reaction at 150° C. until the resin has an acid value of 44.2. The viscosity (60% by weight in xylene, DIN 53 211) is 45 seconds. The OH value of the solvent-free resin is approx. 50 mg KOH/g.

The resin was dissolved in diethylene glycol dimethyl ether to form a 63% solution and the solution thus obtained was neutralized with 4.6 parts dimethyl ethanolamine to 100 parts solution. The solution was then diluted with water to a resin content of 30.4% by weight. Starting out from this aqueous solution, two-component waterborne lacquers were prepared with the polyisocyanate of Example 1. The NCO:OH ratios were 1.25:1, 1.50:1 and 1.75:1. The polyisocyanate is added to the aqueous solution of the resin in the form of a 75% by weight solution in diethylene glycol dimethyl ether. After intensive stirring, a stable emulsion is obtained, remaining processable for about 30 minutes.

Using a film-drawing frame, the emulsions obtained were coated onto glass plates in a wet film thickness of 180 μm and were cured for 30 minutes at 80° C. or 120° C. The results obtained are set out in the following Table.

| NCO:OH | Temp. | Konig pendulum hardness | Crosslinking (solvent test) |
| --- | --- | --- | --- |
| 1.25 | 80 ° C. | 60.6 secs. | Crosslinked |
| 1.25 | 120 ° C. | 108.3 secs. | Crosslinked |
| 1.50 | 80 ° C. | 69.5 secs. | Crosslinked |
| 1.50 | 120 ° C. | 111.4 secs. | Crosslinked |
| 1.75 | 80 ° C. | 76.2 secs. | Crosslinked |
| 1.75 | 120 ° C. | 120.4 secs. | Crosslinked |

The lacquer with an NCO:OH ratio of 1.25:1 was also subjected to a drying test at room temperature. The drying time to the tack-free state was about 3 hours. After curing overnight, a crosslinked elastic coating is obtained.

EXAMPLE 3

2899.3 Parts linseed oil, 666.1 parts pentaerythritol and 734.6 parts trimethylol propane are heated under nitrogen to 200° C. The temperature is then increased from 200 to 260°

C. in 1 hour. The mixture is then boiled at 260° C. until it has a viscosity (70% by weight solution in xylene, DIN 53 211) of 26 seconds.

484.2 Parts trimethylol propane, 440.9 parts benzoic acid, 1069.6 parts phthalic anhydride and 265.0 parts Albertol® KP 626 are added to 2644.0 parts of this resin, followed by heating under nitrogen to 140° C. The temperature is then increased from 140 to 220° C. at a rate of 10° C./h. The mixture is then esterified at 220° C. until it has an acid value of 2.0. The viscosity (50% by weight solution in dimethyl formamide, DIN 53 211) was 16 seconds.

516.9 Parts tetrahydrophthalic anhydride (molten) were added to 3798.0 parts of this resin at 130° C., followed by reaction at that temperature to an acid value of 49.3 and a viscosity of 31 secs. (60% by weight solution in dimethyl formamide, DIN 53 211). The OH value of the solvent-free resin is 95 mg KOH/g.

What is claimed is:

1. A process for the production of a polyurethane coating which comprises

A) emulsifying a polyisocyanate component b) having a viscosity at 23° C. of 50 to 10,000 mPa.s and containing at least one organic polyisocyanate in an aqueous organic solution or dispersion of a relatively high molecular weight polyol component a) containing a mixture of a1) a water-dilutable, hydroxyfunctional polycondensation resin free from urethane and sulfonate groups and having a molecular weight Mn above 500 with a2) at least one water-dilutable, hydroxyfunctional polyacrylate resin having a molecular weight Mn above 500, wherein polyacrylate resin a2) must be present and is present in an amount of up to 100% by weight, based on the weight of component a1), in which the quantitative ratios between the individual components correspond to an equivalent ratio of isocyanate groups of component b) to alcoholic hydroxyl groups of component a) of 0.5:1 to 5:1, B) applying the mixture obtained in A) to a substrate and C) reacting the isocyanate groups and hydroxyl groups to form said polyurethane coating.

* * * * *